Jan. 21, 1958 R. H. DOUGHERTY 2,820,605
ADJUSTABLE BUTTERFLY VALVE WITH SEQUENTIAL
ROTATING AND TILTING MOVEMENTS
Filed June 30, 1955

RICHARD H. DOUGHERTY
INVENTOR.

BY

ATTORNEYS

2,820,605
ADJUSTABLE BUTTERFLY VALVE WITH SEQUENTIAL ROTATING AND TILTING MOVEMENTS

Richard H. Dougherty, Tarzana, Calif.

Application June 30, 1955, Serial No. 519,161

11 Claims. (Cl. 251—163)

This invention relates to a butterfly valve, and more particularly to a butterfly valve incorporating improved means to insure metal-to-metal sealing contact between the movable valve element and the seat therefor.

In my Patent No. 2,655,942, issued October 20, 1953, for a Butterfly Valve With Sequential Rotating and Tilting Opening and Closing Movements, there is shown and described a butterfly valve in which the movable valve element is first rotated to a substantially closed position and is then tilted axially of the valve casing to a fully closed position. Said patent also illustrates several forms of the invention, in one of which there is an elastic or deformable seal element between the movable valve element and its seat, and in another of which there is no deformable seal element so that the seal is effected by metal-to-metal contact. The last-mentioned type, in which a metal-to-metal seal must be effected, is particularly adapted for high temperature operation since high temperature would cause rapid deterioration and wearing of any deformable sealing element provided between the valve disc and valve casing.

In manufacturing valves of the type indicated, in which no deformable seal is provided between the periphery of the valve disc and the valve seat, a substantially perfect fit must be effected between the two cooperating metal seal surfaces in order to prevent leakage of fluid through the valve. These seal surfaces are preferably spherical, and must be machined with the very greatest accuracy or else perfect contact will not be achieved. As a practical matter, it has been discovered that even the closest machining tolerances do not result in such perfect dimensions that continuous metal-to-metal seal contact is achieved in a majority of instances, so that there are necessarily a great number of rejects. The problem is compounded where the valve is of relatively large diameter and is used to control the flow of fluid having a pressure on the order of several thousand pounds per square inch. This is particularly true where the movable valve element, or valve disc, must be relatively thin in order to prevent the valve from weighing more than is tolerable for aircraft uses, since the thin valve disc deflects substantially when subjected to the high pressure. When the valve disc deflects under pressure, this necessarily affects the degree of sealing contact between the valve disc periphery and the valve seat, and in a way which cannot be calculated or foretold since there are too many variables in dimensions, pressures, etc.

In view of the above factors characteristic of butterfly valves of the type indicated, it is an object of the present invention to provide a butterfly valve embodying means to adjust accurately the axis of rotation or fulcrum of the movable element in order to compensate for variations in dimensions and in the deflection of the movable element under pressure.

A further object is to provide butterfly valve adjustment means which may be adjusted to any desired position and will not move out of adjustment despite the effects of extreme vibration such as is present on airplanes.

An additional object is to provide a vernier-type butterfly valve adjustment means incorporating improved sealing, locking and mounting components.

These and other more specific objects will appear upon reading the following specification and claims and upon considering in connection therewith the attached drawing to which they relate.

Figure 1:
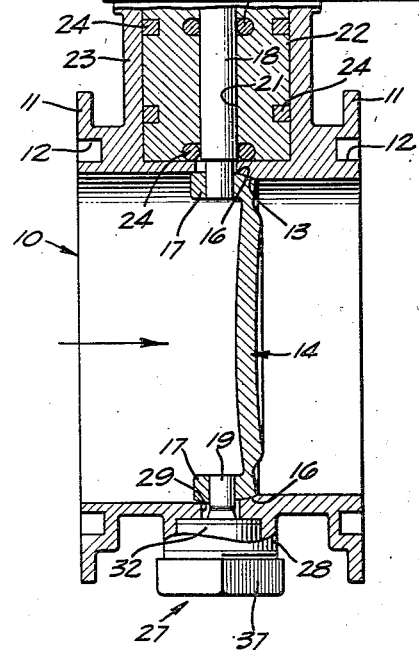
Figure 1 is a side view of the butterfly valve of the invention, the valve proper being shown substantially in central section and the valve actuator being shown in side elevation.

Referring now to the drawing and particularly to Figure 1, the improved butterfly valve is seen to comprise a generally cylindrical casing or housing 10 adapted to be connected into a conduit of corresponding diameter, there being flanges 11 and grooves 12 provided at the ends of casing 10 for reception of conventional connecting and sealing elements. The cylindrical valve passage within casing 10 is necked down slightly to form a valve seat 13, the latter being preferably spherical about a point on the common axis of the valve casing and valve passage. A movable element or valve disc 14, having a peripheral edge surface 16 which is made spherical to correspond to valve seat 13, is mounted in casing 10 for opening and closing movement as will be described. Valve disc 14 is preferably dished slightly in an upstream direction, that is to say convex on the upstream side, so that when the valve is closed the fluid pressure will effect a slight increase in valve disc diameter and thus enhance the sealing contact between edge surface 16 and seat 13.

The upstream side of valve disc 14, opposite from surfaces 13 and 16 which are preferably on the downstream side, is provided at diametrically opposite points with apertured ears or lugs 17 adapted to receive upper and lower actuating or pivot pins 18 and 19. These pins are non-rotatably mounted in the lugs 17 by any suitable means such as by keying. Upper pivot pin 18 fits rotatably, and with sufficient clearance to permit the tilting action to be described subsequently, in a bore 21 which is provided eccentrically of a cylindrical bushing or cam 22. Bushing or cam 22 is mounted within a cylindrical boss component 23 which projects radially outwardly from the upper portion of casing 10, there being suitable temperature-resistant sealing elements 24 provided between the bushing 22 and the boss and pin components with which it is associated.

Mounted on boss component 23 at its end remote from valve disc 14 is a servo actuator 26 which is described in detail in Patent 2,655,942, previously cited. This actuator is operable, as described in the cited patent, to effect both rotation of pivot pin 18 and rotation of bushing 22. Thus, to open the valve from the closed position shown in Figure 1, the bushing 22 is first rotated in order to shift pivot pin 18 bodily to the left in Figure 1, due to the fact that bore 21 is eccentric of bushing 22 as indicated. The pivot pin 18 and valve disc 14 are thus tilted about a fulcrum point at the lower portion of pivot pin 19, as will be described subsequently, and the sealing components or surfaces 13 and 16 are separated from each other. This axial shifting or tilting of the valve disc 14 is very small, on the order of a few thousandths of an inch.

After valve disc surface 16 has been separated from seat 13 as described, the actuator 26 operates to rotate pivot pin 18 about an axis transverse to casing 10 and through any desired angle, for example 90 degrees, in order to effect rotation of disc 14 through the same angle and thus open the valve. The closing operation is the reverse of that described, with the pivot pin 18 being first rotated and then shifted or tilted downstream until valve disc surface 16 and seat 13 are again in the perfect sealing contact illustrated in Figure 1.

As indicated heretofore, it has been found to be impractical or impossible to mass produce butterfly valves of the present type, in which substantially perfect sealing must be effected between metal surface 16 and its seat 13, in the absence of a means for accurately adjusting the valve disc 14 after manufacture and assembly of the valve. Accordingly, vernier-type adjustment means for pivot pin 19 are provided at 27, and will next be described in detail with particular reference to Figures 2 and 3. Adjustment means 27 comprises a second radially projecting cylindrical boss component 28 provided on casing 10 diametrically opposite component 23. Component 28 has a much larger diameter than pin 19, the latter extending into the boss through an opening 29 in the wall of casing 10. The outer wall of casing 10 is made flat at its portion 31 within boss component 28, so that the latter will have a flat bottom wall.

Figure 2:
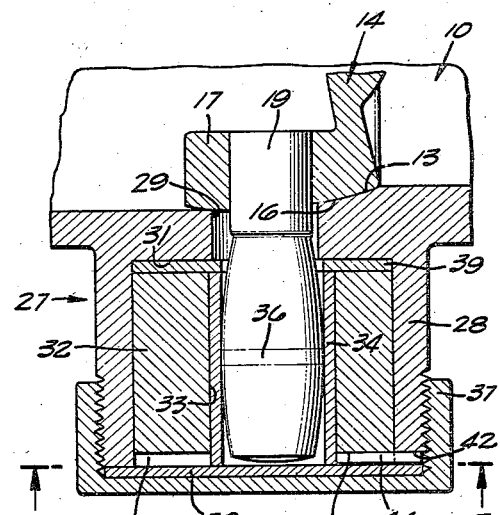
Figure 2 is an enlarged central sectional view of the adjustment means at the lower portion of Figure 1.

A cylindrical metal bushing 32, having a bore 33 formed eccentrically therein, is rotatably mounted within boss component 28. A strong metal sleeve 34, preferably formed of steel, is mounted within bore 33 and around the outer end of pivot pin 19. This outer pivot pin end is rounded, as shown in Figure 2, and is provided at approximately the middle of sleeve 34 with a narrow flat portion 36 which is adapted to rock on the inner sleeve wall. It follows that flat 36 serves as the fulcrum point for the above-described tilting of pivot pins 18 and 19 and disc 14.

A generally cup-shaped end cap 37 is threaded over the outer end of boss component 28 and has a sealing disc or gasket 38, preferably formed of soft metal such as aluminum, in its bottom. Disc 38 is therefore compressed against the outer end of boss 28 and against the outer end of sleeve 34 upon threading of the end cap to tightened position. Such tightening effects axial shifting of sleeve 34 against a sealing washer 39 which is mounted against casing wall portion 31, the washer 39 being also formed of soft metal such as aluminum. The pressure exerted by the end cap, and present between the opposite ends of sleeve 34 and the sealing elements 38 and 39, effects seals at the ends of the sleeve 34 and thus prevents leakage of fluid through the adjustment means 27.

Figure 3:
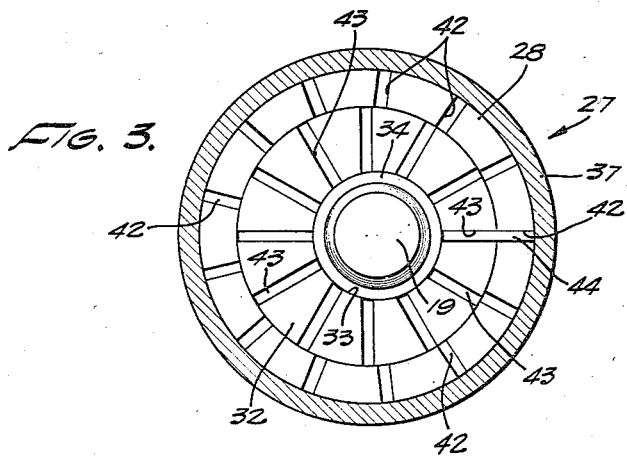
Figure 3 is a section taken on line 3—3 of Figure 2 and as viewed in the direction of the arrows.

In order to effect locking of bushing 32 to boss 28 and in substantially any desired rotated position, a substantial number of radial grooves 42 are provided in the end edge of boss 28, and a substantial number of radial grooves 43 are provided in the outer end wall of the bushing 32. The grooves 42 and 43 are respectively equally spaced about elements 28 and 32, but the number of grooves 42 is one different than the number of grooves 43. Thus, as shown in Figure 3, there may be thirteen grooves 42 and twelve grooves 43.

With the described groove arrangement, two of the grooves 42 and 43 will be registered or aligned in substantially any rotated position of the bushing 32. In order to lock the bushing in position, a key 44 is inserted in the two aligned grooves 42 and 43, after which the end cap 37 is mounted so that the key may not be removed. This adjustment construction insures that the bushing 32 may not rotate relative to the casing after it is locked, and despite the effects of extreme vibration such as is present on airplanes.

The degree of eccentricity of bore 33 in bushing 32 is preferably about the same as the eccentricity of bore 21 in upper bushing 22. For example, the eccentricity may be 50 to 150 thousandths of an inch. It is to be understood that the opening 29 has sufficient diameter to permit shifting of lower pivot pin 19 axially of the valve passage, whether effected by rotation of the bushing 22 or by tilting of the pins 18 and 19 and disc 14.

In adjusting the butterfly valve structure, the bushing 32 is first rotated to a trial position, key 44 is inserted, and the cap 37 is mounted as illustrated. Thereafter, the valve is mounted in a test conduit and the design fluid pressure is applied thereto. Actuator 26 is then operated to open and close the movable valve element 14 a number of times, by carrying out the above-described rotational movements and also tilting movements about fulcrum flat 36 and sleeve 34. During this time, a careful check is made to determine the presence or absence of such factors as sticking or catching of the edges of the valve disc 14, leakage of fluid through the valve, etc.

If the valve is found to be deficient in any respect, the test pressure is removed, cap 37 is taken off, and key 44 is removed. Thereupon, the bushing 32 is rotated to a second trial position, and the key 44 and end cap 37 are again mounted. The test pressure is then again applied, and the opening-closing movements performed, and this procedure is repeated until perfect results are achieved. The valve is thus set for the precise operating conditions under which it will be used, and it is known that such factors as deflection of disc 14 and variations in dimensions will not result in faulty valve operation.

While the particular device herein shown and disclosed in detail is fully capable of attaining the objects and providing the advantages hereinbefore stated, it is to be understood that it is merely illustrative of the presently preferred embodiments of the invention and that no limitations are intended to the details of construction or design herein shown other than as defined in the appended claims.

I claim:

1. A butterfly valve, which comprises a valve casing having a fluid passage therein, a valve seat provided in said casing and encompassing said passage, a movable valve element disposed in said passage and adapted to sealingly engage said valve seat, actuating means mounted at one side of said passage and connected to one edge portion of said movable valve element, said actuating means being adapted to rotate said movable valve element about an axis transverse to said passage and being also adapted to shift said one edge portion of said movable valve element longitudinally of said passage, pivot means mounted at the other side of said passage and connected to the opposite edge portion of said movable valve element, said pivot means being adapted to permit both rotation of said movable valve element about said transverse axis and to also permit shifting of said opposite edge portion longitudinally of said passage as said one edge portion is shifted by said actuating means, and means to adjust the position of said pivot means relative to said valve seat to vary the position of said opposite edge portion of said valve element relative to said valve seat and the seating of said element on said seat.

2. The invention as claimed in claim 1, in which said valve seat is formed of rigid metal and comprises a concave zone of a sphere, and in which the edge portion of said movable valve element is formed of rigid metal and comprises a convex zone of a sphere corresponding to said valve seat for surface engagement therewith.

3. The invention as claimed in claim 1, in which said pivot means includes a pivot pin rigidly associated with said opposite edge portion of said movable valve element and extending laterally of said passage, and in which said adjustment means comprises a bushing rotatable about an axis transverse to said passage and in which said pivot pin is eccentrically mounted for tilting and rotational movement therein.

4. The invention as claimed in claim 3, in which vernier means are provided to rigidly lock said bushing in a multiplicity of rotated positions.

5. A butterfly valve device, which comprises a generally cylindrical metal valve casing having a cylindrical fluid passage extending longitudinally therethrough, an annular valve seat formed on the interior wall of said casing, said seat having a concave surface which is spherical about a point on the longitudinal axis of said passage, a metal valve disc disposed in said passage and having a convex spherical edge surface corresponding to said concave surface and adapted to come into substantially continuous metal-to-metal contact therewith, first and second pivot pins non-rotatably connected to diametrically opposite edge portions of said disc, said pins extending radially outwardly from said disc along a common pivot axis transverse to said passage, actuating means to rotate said first pivot pin about said pivot axis and also to tilt said pivot axis about a fulcrum point on said second pivot pin, a cylindrical bushing journaled in said casing for rotary adjustment about an axis transverse to said passage and coincident with the axis of said bushing, said bushing having a bore formed longitudinally therethrough and offset relative to said bushing axis, fulcrum means to pivotally and tiltingly associate said second pivot pin with the bore of said bushing at said fulcrum point, and means to lock said bushing in a selected position which it retains in the operation of said actuating means.

6. The invention as claimed in claim 5, in which said actuating means includes a second cylindrical bushing journaled in said casing and formed with an eccentrically located longitudinal passage adapted to receive said first pivot pin, and means to sequentially rotate said second bushing and said first pivot pin.

7. The invention as claimed in claim 5, in which an end cap is threaded onto said casing over said bushing and soft metal gaskets are provided in the bottom of said end cap and adjacent said bushing remote from said end cap, and in which said fulcrum means include a rigid metal sleeve disposed in said bore and in circular contact with an enlarged portion of said second pivot pin at said fulcrum point, said sleeve being of a length to be sealingly compressed against said gaskets upon tightening of said cap onto said casing.

8. The invention as claimed in claim 7, in which locking means are provided in the form of a plurality of circumferentially and equally spaced radial grooves in said casing around said bushing, and a plurality of circumferentially and equally spaced radial grooves in said bushing, the number of casing grooves being one different than the number of bushing grooves, and key means inserted in registered ones of said casing and bushing grooves.

9. A butterfly valve, which comprises a valve casing having a fluid passage therein, a valve seat provided in said casing encompassing said passage, a movable valve element disposed in said passage and adapted to sealingly engage said valve seat, actuating means mounted at one side of said passage and connected to one edge portion of said movable valve element, said actuating means being adapted to rotate said movable valve element about an axis transverse to said passage and being also adapted to shift said one edge portion of said movable valve element longitudinally of said passage, pivot means mounted at the other side of said passage and connected to the opposite edge portion of said movable valve element, said pivot means being constructed and arranged to permit both rotation of said movable valve element about said transverse axis and also to permit shifting of said opposite edge portion longitudinally of said passage as said one edge portion is shifted by said actuating means, and means to adjust the position of said pivot means toward, from and parallel to the plane of said valve seat.

10. The construction recited in claim 9 characterized in that said pivot means includes a pivot pin rigidly associated with said opposite edge portion of said movable valve element and extending laterally of said passage, and in which said adjustment means comprises a bushing rotatable about an axis transverse to said passage and in which said pivot pin is eccentrically mounted for tilting and rotational movement therein.

11. The construction cited in claim 10 in which vernier means are provided to rigidly lock said bushing in a number of rotated positions.

References Cited in the file of this patent

UNITED STATES PATENTS

| 2,655,942 | Dougherty | Oct. 20, 1953 |
| 2,673,061 | Broz | Mar. 23, 1954 |

FOREIGN PATENTS

| 599,176 | France | Oct. 13, 1925 |
| 785,155 | France | May 13, 1935 |